(12) United States Patent
Liang

(10) Patent No.: US 11,506,803 B2
(45) Date of Patent: Nov. 22, 2022

(54) METHOD AND DEVICE FOR PROCESSING NUCLEAR ENERGY SPECTRUM

(71) Applicant: BEIJING POWER-RESOLUTION TECHNOLOGY CO. LTD., Beijing (CN)

(72) Inventor: Weiping Liang, Beijing (CN)

(73) Assignee: BEIJING POWER-RESOLUTION TECHNOLOGY CO. LTD., Beijing (CN)

( * ) Notice: Subject to any disclaimer, the term of this patent is extended or adjusted under 35 U.S.C. 154(b) by 0 days.

(21) Appl. No.: 17/280,031

(22) PCT Filed: Sep. 25, 2019

(86) PCT No.: PCT/CN2019/107712
§ 371 (c)(1),
(2) Date: Mar. 25, 2021

(87) PCT Pub. No.: WO2020/063629
PCT Pub. Date: Apr. 2, 2020

(65) Prior Publication Data
US 2022/0035058 A1    Feb. 3, 2022

(30) Foreign Application Priority Data
Sep. 25, 2018 (CN) .......................... 201811113041.6

(51) Int. Cl.
*G01T 1/36* (2006.01)
*G01T 3/00* (2006.01)
*G01T 1/17* (2006.01)

(52) U.S. Cl.
CPC ................ *G01T 1/362* (2013.01); *G01T 1/17* (2013.01); *G01T 1/366* (2013.01); *G01T 3/001* (2013.01)

(58) Field of Classification Search
CPC ........... G01T 1/362; G01T 1/366; G01T 1/36; G01T 1/17; G01T 3/001
See application file for complete search history.

(56) References Cited

U.S. PATENT DOCUMENTS

2004/0027183 A1 * 2/2004 Binkley ................. H03K 5/007
327/172
2008/0103727 A1 * 5/2008 Ota ........................... G01T 1/17
702/180
(Continued)

FOREIGN PATENT DOCUMENTS

| CN | 101799554 A | * | 8/2010 | ............... G01T 1/36 |
| CN | 101799554 A |   | 8/2010 | |

(Continued)

OTHER PUBLICATIONS

First Office Action dated Apr. 15, 2021 for related Chinese Patent Application No. 201811113041.6.
(Continued)

*Primary Examiner* — David P Porta
*Assistant Examiner* — Jeremy S Valentiner

(57) ABSTRACT

This application discloses a method and an apparatus for processing a nuclear energy spectrum. The apparatus includes: a detector, a nuclear pulse processing module, and a nuclear energy spectrum processing module; the detector is configured to detect nuclear radiation and convert the nuclear radiation into nuclear pulse signals with corresponding amplitudes; the nuclear pulse processing module is configured to shape the nuclear pulse signals into narrow pulses, and perform amplitude analysis on the narrow pulses to generate the nuclear energy spectrum; the nuclear energy spectrum processing module is configured to reduce a value of an energy resolution of the nuclear energy spectrum to obtain the nuclear energy spectrum with the energy resolution of the reduced value.

12 Claims, 4 Drawing Sheets

400

Detecting nuclear radiation and converting the nuclear radiation into nuclear pulse signals with corresponding amplitudes — S410

Shaping the nuclear pulse signals into narrow pulses, and performing amplitude analysis on the narrow pulses to generate the nuclear energy spectrum — S420

Reducing a value of an energy resolution of the nuclear energy spectrum, to obtain the nuclear energy spectrum with the energy resolution the reduced value — S430

(56) References Cited

U.S. PATENT DOCUMENTS

2013/0187052 A1* 7/2013 Nelson .................. G01T 1/17
250/362
2013/0193330 A1 8/2013 Wagadarikar et al.
2016/0370494 A1* 12/2016 Zhou .................... G01T 1/20

FOREIGN PATENT DOCUMENTS

| CN | 102455430 A | * | 5/2012 | ............. | G01T 1/17 |
|---|---|---|---|---|---|
| CN | 103412319 A | | 11/2013 | | |
| CN | 103424766 A | | 12/2013 | | |
| CN | 103605148 A | | 2/2014 | | |
| CN | 204331044 U | | 5/2015 | | |
| CN | 104749603 A | | 7/2015 | | |
| CN | 106772540 A | | 5/2017 | | |
| CN | 109142403 A | | 1/2019 | | |
| JP | S59122987 A | | 7/1984 | | |
| WO | WO2010054018 A1 | | 5/2010 | | |

OTHER PUBLICATIONS

International Search Report dated Dec. 25, 2019 for related International Patent Application No. PCT/CN2019/107712.
Wei Yixiang et al., "Introduction to Nuclear Energy and Technology," National Defense Special Textbook, Nuclear Science and Technology, Harbin Engineering University Press, Jul. 31, 2011, pp. 58-73.
Ai Xianyun et al., "Direct demodulation method for Y spectra analysis detected by CZT detectors," Tsinghua University, Science and Technology, Dec. 31, 2006, pp. 821-824, vol. 46, No. 6, Beijing, China.
Extended European Search Report dated Apr. 28, 2022 for European Application No. 19867719.7.
Xianyun A et al. , "Direct demodulation method for [gamma] spectra analysis detected by CZT detectors", The Institution of Electrical Engineers Stevenage, GB, Jun. 2006.

* cited by examiner

METHOD AND DEVICE FOR PROCESSING NUCLEAR ENERGY SPECTRUM

CROSS-REFERENCE TO RELATED APPLICATIONS

This application is a National Stage of International Application No. PCT/CN2019/107712, filed on Sep. 25, 2019, which claims priority to Chinese patent application No. 201811113041.6, entitled "METHOD AND APPARATUS FOR PROCESSING NUCLEAR ENERGY SPECTRUM", filed on Sep. 25, 2018, the entire contents of which are incorporated herein by reference.

TECHNICAL FIELD

This application relates to the field of nuclear energy spectrum measurement and analysis, and in particular to a method and equipment for processing nuclear energy spectrum.

BACKGROUND

Nuclear radiation refers to rays with one or more levels of energy, emitted by a radioactive source or radiation apparatus, in the form of waves or particles, such as α rays, β rays, γ rays, X-rays or neutrons. As nuclear radiation has great application values in many fields such as military, industry, agriculture, medical and health, scientific research, environmental protection, public safety, it is very important to measure and analyze a nuclear energy spectrum that can reflect the energy distribution of nuclear radiation.

At present, key technical indicators affecting the measurement and analysis of nuclear energy spectrum include a relative energy resolution and pulse throughput. The relative energy resolution is defined as a ratio of a full width at half maximum (FWHM) to a peak position energy, which indicates a detector's ability to resolve different energy rays. The smaller the value of the energy resolution, the better the energy resolution performance of the measurement is, the easier it is to resolve the spectral lines, the more accurate of the measurement and analysis. Pulse throughput reflects the processing speed of nuclear pulses, which mainly depends on the minimum time interval of nuclear pulses that can be processed correctly, and is closely related to the shape of the nuclear pulses outputted by the detector. The higher the pulse throughput, the higher radiation levels under which nuclear energy spectrum measurement can be performed.

The existing nuclear energy spectrum measurement technologies mainly use signal-to-noise ratio-first nuclear pulse processing technologies, and have poor pulse throughput. Although some nuclear energy spectrum measurement and analysis technologies use speed-first energy spectrum measurement technologies, they do not solve the problem of degradation of the energy resolution. In the current processing of nuclear energy spectrum, the two key technical indicators of the energy resolution (which represents precision) and pulse throughput (which represents speed) restrict each other, so that the requirement for the high-performance of the measurement and analysis of nuclear energy spectrum under high pulse counting rates cannot be met.

SUMMARY

According to the method and apparatus for processing a nuclear energy spectrum provided by the embodiments of the present application, high-performance of the resolution of nuclear energy spectrum can be achieved under the condition that the pulse throughput is guaranteed first, thus realizing the high performance of the resolution of nuclear energy spectrum with high pulse counting rates.

According to an aspect of the embodiments of the present application, an apparatus for processing a nuclear energy spectrum is provided, where the apparatus includes: a detector, a nuclear pulse processing module, and a nuclear energy spectrum processing module;

the detector is configured to detect nuclear radiation and convert the nuclear radiation into a nuclear pulse signal with a corresponding amplitude;

the nuclear pulse processing module is configured to shape the nuclear pulse signal into narrow pulses, and perform amplitude analysis on the narrow pulses to generate the nuclear energy spectrum;

the nuclear energy spectrum processing module is configured to reduce a value of an energy resolution of the nuclear energy spectrum to obtain a nuclear energy spectrum with the energy resolution of the reduced value.

According to another aspect of the embodiments of the present application, a method for processing a nuclear energy spectrum is provided, where the method includes:

detecting nuclear radiation and converting the nuclear radiation into a nuclear pulse signal with a corresponding amplitude;

shaping the nuclear pulse signal into narrow pulses, and performing amplitude analysis on the narrow pulses to generate the nuclear energy spectrum; and reducing a value of an energy resolution of the nuclear energy spectrum, to obtain the nuclear energy spectrum with the energy resolution of the reduced value.

According to the method and apparatus for processing a nuclear energy spectrum provided by the embodiments of the present application, the nuclear radiation is detected first, and the nuclear radiation is converted into the nuclear pulse signal with the corresponding amplitude; then the nuclear pulse signal is converted into the narrow pulses, and the amplitude analysis is performed on the narrow pulses to measure the nuclear energy spectrum; finally the value of the energy resolution of the nuclear energy spectrum is reduced, so that the accuracy of the analysis of the energy spectrum is improved while the pulse throughput is ensured.

BRIEF DESCRIPTION OF THE DRAWINGS

Features, advantages, and technical advantages of exemplary embodiments of the present application will be described below with reference to the drawings.

DETAILED DESCRIPTION

Implementations of the present application are described in further detail below with reference to the drawings and embodiments. The detailed description and drawings of the following embodiments are used to exemplarily illustrate the principles of the present application instead of limiting the scope of the present application. That is, the present application is not limited to the described embodiments.

It is to be noted that relational terms such as first, second, and the like are used herein solely to distinguish one entity or operation from another entity or operation without necessarily requiring or implying any actual such relationship or order between such entities or operations. Moreover, the terms "include", "including", or any other variation thereof, are intended to cover a non-exclusive inclusion, such that a process, method, article or device that includes a series of elements does not include only those elements but may include other elements not explicitly listed or inherent to such process, method, article or device. An element preceded by "include . . . " does not, without more constraints, preclude the existence of additional identical elements in the process, method, article or device that includes the element.

The following firstly describes in detail the equipment for processing nuclear energy spectrum according to the embodiments of the present application with reference to the accompanying drawings.

Figure 1:
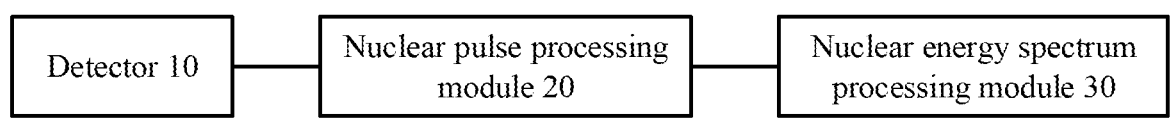
FIG. 1 illustrates a schematic structural diagram of an apparatus for processing a nuclear energy spectrum according to an embodiment of the present application.

FIG. 1 illustrates a schematic structural diagram of an apparatus for processing a nuclear energy spectrum 100 according to an embodiments of the present application. As shown in FIG. 1, the apparatus for processing nuclear energy spectrum 100 includes a detector 10, a nuclear pulse processing module 20, and a nuclear energy spectrum processing module 30.

The detector 10 is configured to detect nuclear radiation and convert the nuclear radiation into nuclear pulse signals with corresponding amplitudes. The detector 10 may be a gas detector, a scintillation detector, a semiconductor detector, or the like. When a nuclear radiation particle enters the detector 10, the interaction causes the detector to output a nuclear pulse signal with an amplitude that is in direct proportion to a nuclear radiation energy absorbed by the detector 10.

The nuclear pulse processing module 20 is configured to shape the nuclear pulse signals outputted by the detector 10 into narrow pulses with widths that are much narrower than the original widths of the nuclear pulse signals and amplitudes that are in direct proportion to the original amplitudes of the nuclear pulse signals, and perform amplitude analysis on the narrow pulses to generate the nuclear energy spectrum.

The nuclear energy spectrum processing module 30 is configured to reduce a value of an energy resolution of the nuclear energy spectrum, to obtain the nuclear energy spectrum with the energy resolution of the reduced value.

In the embodiments of the present application, to reduce the energy resolution means to reduce the value of the energy resolution. The smaller the value of the energy resolution is, the better the performance of the resolution of energy is, the easier it is to resolve the spectral lines of the nuclear energy spectrum, the more accurate of the measurement and analysis of the nuclear energy spectrum is. In other words, to reduce the energy resolution of the nuclear energy spectrum is to improve the energy resolution of the nuclear energy spectrum, that is, to improve the quality of the nuclear energy spectrum and the performance of the measurement and analysis of the nuclear energy spectrum.

For example, the apparatus for processing the nuclear energy spectrum may be a scintillation gamma (γ) spectrometer, the nuclear radiation may be gamma rays, and the detector may include a scintillation crystal, a photoelectric converter, and a preamplifier. The scintillation crystal may be a sodium iodide NaI(Tl) scintillation crystal, a cesium iodide CsI(Tl) scintillation crystal, a lanthanum chloride $LaCl_3(Ce)$ scintillation crystal, a lanthanum bromide $LaBr_3$(Ce) scintillation crystal, or a lithium-based potassium cryolite type scintillation crystal, such as $Cs_2LiYCl_6(Ce)$, $Cs_2LiYBr_6(Ce)$, $Cs_2LiLaCl_6(Ce)$ and $Cs_2LiLaBr_6(Ce)$. The photoelectric converter may be a photomultiplier tube (PMT), a silicon photomultiplier tube (SiPM), or the like. The preamplifier may be a charge-sensitive preamplifier, a voltage-sensitive preamplifier, or a current-sensitive preamplifier.

In a scenario where the nuclear energy spectrum needs to be measured, the nuclear radiation is incident on the scintillation crystal in the detector. The nuclear radiation deposits its energy through the interaction with the scintillation crystal, and the deposited energy is converted into corresponding optical signals. The photoelectric converter receives the optical signals emitted from the scintillation crystal and converts the optical signals into electrical signals. The pre-amplifier performs matching adjustment and preliminary amplification on the electrical signals outputted by the photoelectric converter. After the nuclear radiation interacts with the detector and deposits energy, the detector outputs nuclear pulse signals with corresponding amplitudes. The amplitudes of the nuclear pulse signals are in direct proportion to the energy absorbed by the detector.

Figure 2:
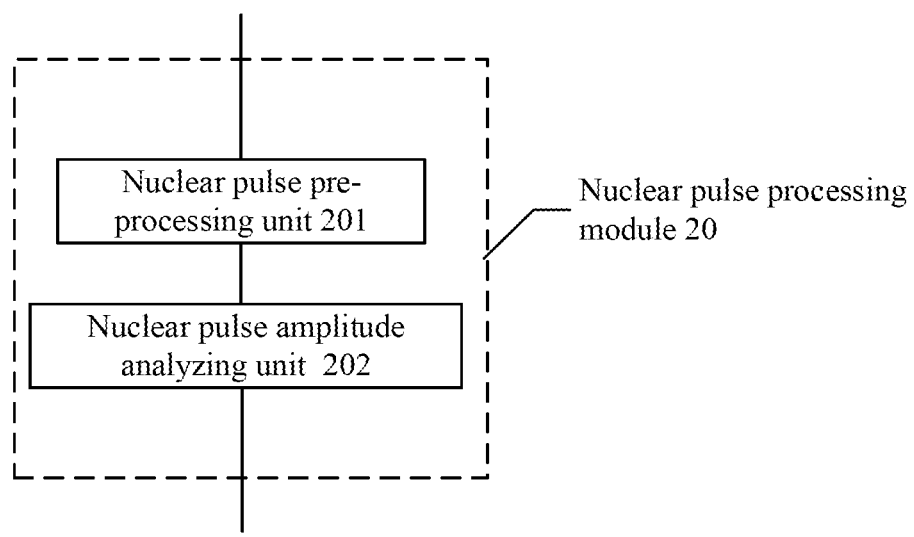
FIG. 2 illustrates a schematic structural diagram of a nuclear pulse processing module according to an embodiment of the present application.

In an embodiment according to the present application, the detector 10 outputs the nuclear pulse signals to the nuclear pulse processing module 20. FIG. 2 illustrates a schematic structural diagram of the nuclear pulse processing module 20 according to an embodiment of the present application. As shown in FIG. 2, the nuclear pulse processing module 20 includes a nuclear pulse pre-processing unit 201 and a nuclear pulse amplitude analyzing unit 202.

The nuclear pulse pre-processing unit 201 is configured to process the nuclear pulse signals outputted by the detector 10 into the narrow pulses using a pre-built nuclear pulse response model. The nuclear pulse response model is a function model that is built by fitting pre-acquired nuclear pulse signals corresponding to a large number of standard nuclear radiation particles.

The nuclear pulse amplitude analyzing unit 202 is configured to analyze the amplitudes of the narrow pulses and record the number of narrow pulse signals with same amplitudes to measure the nuclear energy spectrum.

In an embodiment of the present application, the event of the nuclear radiation entering the detector and depositing unit energy may be equivalent to an ideal impulse function, where the pulse width of the ideal impulse function is 0, and the amplitude is the deposited energy. In other words, the impulse function corresponding to each standard monoenergetic nuclear radiation is an equivalent function of the deposited energy of each standard monoenergetic nuclear radiation. For example, the ideal impact function of the incident nuclear radiation may be expressed as $E \cdot \delta(t)$, where E refers to the deposited energy, δ refers to the Dirac function, and t refers to time. It is assumed that the output nuclear impulse response model of the detector is a single-index decay function, $f(t)=E \cdot e^{-t/\tau}$, which is subject to the time constant τ. Digital nuclear pulse signals, $f(n)=E \cdot e^{-n \cdot T_s/\tau}$, are obtained by sampling with an analog-to-digital converter of which the sampling period is $T_s$. The nuclear pulse pre-processing unit 201 utilizes an infinite impulse response digital filter (IIR), $V_o(n)=V_i(n)-e^{-T_s/\tau} \cdot V_i(n-1)$, to process the nuclear pulse signals outputted by the detector, and a sequence of narrow pulses, E·δ(n), are obtained after the processing, where $V_i$ is the input sequence, and $V_o$ is the output sequence.

In an embodiment of the present application, the nuclear pulse pre-processing unit 201 restores the nuclear pulse signals to spike narrow pulses that approximately are impulse functions, so that two aspects of the information of the nuclear pulse signals, including arrival time and deposited energy, can be restored. Since the pulse widths are reduced, the probability of nuclear pulse accumulation is reduced, thereby improving the pulse throughput of the nuclear pulses and ensuring signal integrity. In the embodiments of the present application, the pulse throughput can be up to 10 Mcps.

In an embodiment of the present application, the nuclear pulse amplitude analyzing unit 202 may be connected to the nuclear pulse pre-processing unit 201. The nuclear pulse amplitude analyzing unit 202 may be configured to analyze the amplitudes of the narrow pulse signals and record the number of narrow pulse signals with same amplitudes, so that the nuclear energy spectrum of the nuclear radiation is measured.

The nuclear pulse amplitude analyzing unit 202 may evenly divide the entire range covering the amplitudes of the measured nuclear pulses into several intervals, and classify and count the nuclear pulses based on amplitude values of each of the nuclear pulses actually measured and the above intervals, and accumulate the number of nuclear pulses falling in each amplitude interval, so that the nuclear energy spectrum is generated.

In an embodiment of the present application, the nuclear pulse processing module 20 may be an analog circuit or a digital circuit. The digital circuit may include a digital signal processing device. In addition, the nuclear pulse processing module 20 may also use a combination of an analog circuit and a digital circuit to process the nuclear pulse signals.

For example, the digital signal processing device configured for digital nuclear pulse processing may include a complex programmable logic device (CPLD), a field programmable gate array (FPGA), a digital signal processor (DSP), or a micro processor unit (MPU).

In an embodiment of the present application, the processing of the nuclear pulses may include processing the collected nuclear pulse signals in an online real-time manner or an offline non-real-time manner, or multiple nuclear pulse processing modules may work in parallel to improve the performance of the processing of the nuclear pulse signals.

In an embodiment of the present application, the apparatus for processing the nuclear energy spectrum may further include a power supply module configured to provide the detector 10 and the nuclear pulse processing module 20 with a high voltage power supply and a low voltage power supply required for their operations.

In an embodiment of the present application, the nuclear pulse processing module 20 and the nuclear energy spectrum processing module 30 may be connected through a data interface for the transmission of the data of the measured nuclear energy spectrum to the nuclear energy spectrum processing module 30, so that the nuclear energy spectrum processing module 30 may pre-process the spectrum to improve the energy resolution before quantitative analysis.

In an embodiment of the present application, the nuclear energy spectrum processing module 30 may be configured to reduce the value of the energy resolution of the nuclear energy spectrum to obtain the nuclear energy spectrum with the energy resolution of the reduced value, and the nuclear energy spectrum processing module 30 may further be configured to perform quantitative analysis on the nuclear energy spectrum with the energy resolution of the reduced value to obtain characteristic information of the nuclear radiation.

In an embodiment of the present application, the characteristic information of the nuclear radiation may include at least one of the following types of information: an energy of the nuclear radiation, an intensity is produced, and activity of the radionuclides producing the nuclear radiation.

In an embodiment of the present application, the nuclear energy spectrum processing module 30 may be an embedded computer system or an independent computer system. The nuclear energy spectrum processing module may realize the processing of the nuclear energy spectrum based on an embedded processor. An embedded microprocessor in the nuclear energy spectrum processing module may be PXA270. When an MPU is used by the nuclear pulse processing module 20 as a processing device for digital signals, the MPU may also be used as the processor of the nuclear energy spectrum processing module 30.

Figure 3:
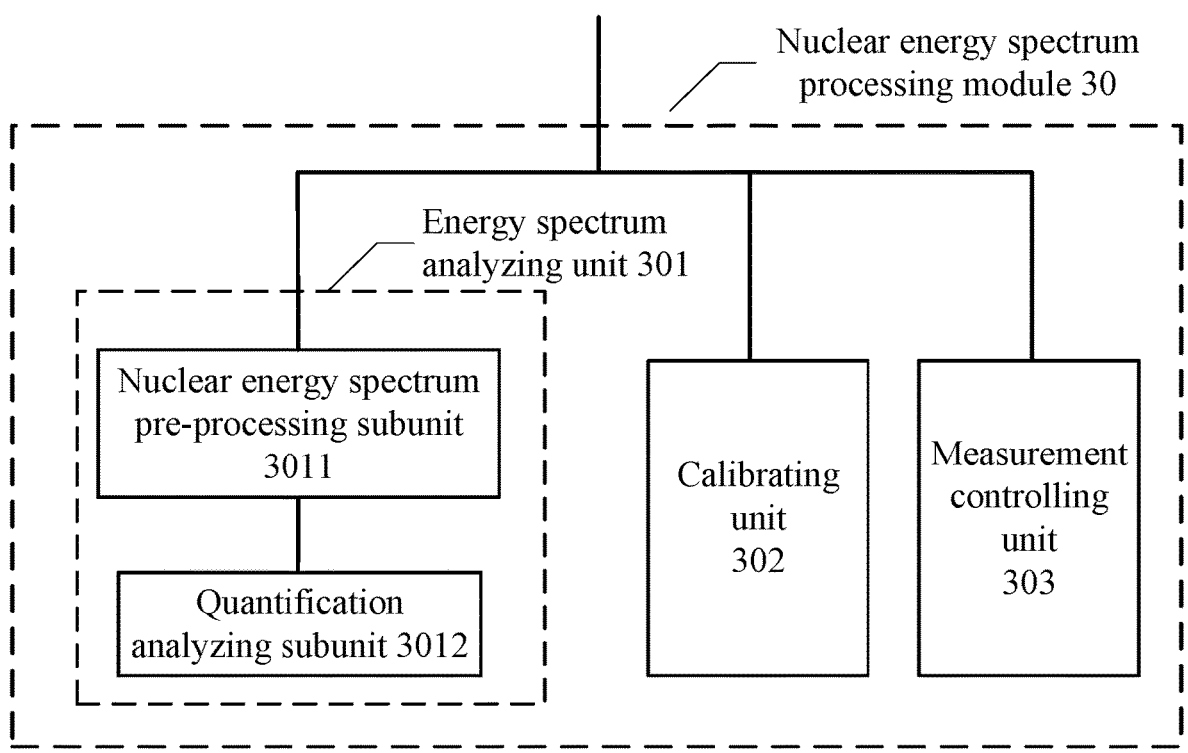
FIG. 3 illustrates a schematic structural diagram of a nuclear energy spectrum processing module according to an embodiment of the present application.

FIG. 3 illustrates a schematic structural diagram of a nuclear energy spectrum processing module according to an embodiment of the present application. As shown in FIG. 3, the nuclear energy spectrum processing module 30 may include an energy spectrum analyzing unit 301, a calibrating unit 302, and a measurement controlling unit 303.

In an embodiment of the present application, the energy spectrum analyzing unit 301 may include a nuclear energy spectrum pre-processing subunit 3011 and a quantification analyzing subunit 3012. The nuclear energy spectrum pre-processing subunit 3011 may be connected to the nuclear pulse amplitude analyzing unit 202, and may be configured to pre-process the measured nuclear energy spectrum to reduce the value of the energy resolution of the nuclear energy spectrum.

In the embodiment of the present application, the calibrating unit 302 may be configured to calibrate the whole system of the apparatus for processing the nuclear energy spectrum.

The measurement controlling unit 303 may be connected to the nuclear pulse amplitude analyzing unit 202 and configured to control the measurement process of the nuclear energy spectrum.

In an embodiment of the present application, the nuclear energy spectrum pre-processing subunit 3011 may use a Gaussian function-based nuclear energy spectrum response model and a direct demodulation calculation method to reduce the value of the energy resolution of the nuclear energy spectrum. The nuclear energy spectrum response model is a Gaussian function model that is determined based on measured fitting parameters of characteristic peaks of nuclear energy spectrums of various types of incident monoenergetic nuclear radiation particles of known energies. The nuclear energy spectrum response model needs to be acquired from the calibrating unit 302.

In the analyzing of an unknown nuclear energy spectrum, the nuclear energy spectrum pre-processing subunit 3011 may use the nuclear energy spectrum response model to improve the energy resolution of the unknown nuclear energy spectrum through an inverse solving method such as the direct demodulation method.

After the energy resolution of the nuclear energy spectrum is improved by the nuclear energy spectrum pre-processing subunit 3011, the quantification analyzing subunit 3012 may perform the quantitative analysis to obtain quantitative analysis results including the types and the activity of the radionuclides.

In an embodiment of the present application, the characteristic parameters required for the processing of the nuclear energy spectrum may further include an energy calibration curve and an efficiency calibration curve. The quantification analyzing subunit 3012 may perform the quantitative analysis on the nuclear energy spectrum in connection with the energy calibration curve and the efficiency calibration curve.

For example, when the nuclear energy spectrum of the nuclear radiation to be measured is acquired by the quantification analyzing subunit 3012, the characteristic peak positions may be identified though algorithms such as the second-order difference method and the symmetric zero-area transformation method. The identified characteristic peak positions may be converted into characteristic peak energies based on the energy calibration curve. Then the most suitable characteristic peaks are matched in the nuclide library based on the energies, so that the types of nuclides in the nuclear radiation signals to be measured are identified.

According to the nuclear energy spectrum processing module provided by the embodiments of the application, with the utilization of the nuclear energy spectrum response model, the energy resolution can be improved, the FWHM of the characteristic peaks can be reduced to less than 6, the limitation of the detector and the nuclear pulse processing module on the energy resolution can be broken through, so that the resolving ability to approximately resolve the incident spectrum can be achieved. In addition, the nuclear energy spectrum processing module ensures the accuracy of peak positions and peak areas of short-distanced overlapped peaks by pre-processing the nuclear energy spectrum measured by the nuclear pulse processing module.

The apparatus for processing the nuclear energy spectrum according to the embodiments of the present application is as a whole an information processing system. The input of the system is nuclear radiation subject to the ideal discrete energy spectrum, and the output of the system is the measured spectrum. If priority is given by the system design to ensuring information integrity, the physical information can be restored from the measured spectrum using a sufficiently accurate system model and an appropriately designed algorithm after the physical information of the nuclear radiation passes through the system, thereby completely eliminating the physical limitations of hardware in the detector 10 and the nuclear pulse processing module 20 on the measurement and analysis of the nuclear energy spectrum.

The apparatus for processing the nuclear energy spectrum according to the embodiments of the present application is specifically divided into two stages, including an energy spectrum measurement stage consisting of the detector and the nuclear pulse processing module, and an energy spectrum analysis stage consisting of the nuclear energy spectrum processing module. The two stages cooperate with each other and have a cascade relationship. The energy spectrum measurement stage mainly restores the nuclear pulse information through to the nuclear pulse processing module to achieve high-fidelity acquisition and processing of the nuclear pulses. In the case of high counting rates, the high-fidelity acquisition and processing of the nuclear pulses is mainly reflected in passing the nuclear pulse as quickly as possible to avoid, as possible, discarding useful information. The nuclear energy spectrum processing module in the energy spectrum analysis stage compensates for, through energy spectrum analysis, the loss of energy resolution caused by the speed-first strategy and the inherent resolution limit of the detector, which realizes the restoration of the information of the nuclear energy spectrum, thus the problem of pursuing both the pulse throughput and the energy resolution in the process of energy spectrum measurement and analysis is well solved, and the energy spectrum acquisition efficiency and analytical ability are greatly improved.

In the embodiments of the present application, the apparatus for processing the nuclear spectrum, from the angle of information recovery, solves the conflict between the pulse throughput and the energy resolution through the two-stage processing for information recovery of the nuclear pulses and the nuclear spectrum, which realizes the application requirements of resolving the nuclear spectrum with great performance under high counting rates.

The apparatus for processing the nuclear energy spectrum according to the embodiments of the application significantly lowers the hardware configuration requirements of the detector, the nuclear pulse processing module, and the nuclear energy spectrum processing module, which is conducive to obtaining excellent measurement and analysis performance with cheap hardware configurations, and the apparatus for processing the nuclear energy spectrum has great hardware versatility, which is conducive to reducing the cost of design, production, and maintenance. In addition, the firmware and software in the nuclear pulse processing module and the nuclear energy spectrum processing module are easy to upgrade, have good portability and scalability, and support secondary development by users.

In the embodiments of the present application, the apparatus for processing the nuclear energy spectrum may be a nuclear energy spectrometer operating in a pulsed manner, and the apparatus may be any of the following types of apparatus: a gamma spectrometer, a neutron activation prompt gamma radiation analyzer, an alpha spectrometer, an X-ray spectrometer, a neutron spectrometer, and the like.

In the embodiments of the present application, the types of the detectors in the apparatus for processing the nuclear energy spectrum, the measurement parameters in the nuclear pulse processing module and the analysis parameters in the nuclear energy spectrum processing module may be determined according to the types of nuclear radiation signals that need to be measured.

For example, the apparatus for processing the nuclear energy spectrum may be a scintillation detector-based gamma spectrometer. The detector may be selected from a sodium iodide NaI(Tl) scintillation crystal, a cesium iodide CsI(Tl) scintillation crystal, a lanthanum bromide $LaBr_3$ (Ce) scintillation crystal, or other scintillation detectors. The photoelectric converter may be a photomultiplier tube or a silicon photomultiplier tube. After γ-rays enter the scintillation crystal, optical pulse signals are generated. The optical pulse signals enter the photomultiplier tube or the silicon photomultiplier tube, electrical pulse signals are generated, and then the electrical pulse signals are outputted to the nuclear pulse processing module through the preamplifier. The high voltage power supply and the low voltage power supply required by the photoelectric converter and the preamplifier may be provided by a power supply circuit.

Based on the type of the scintillation detector that is used, the conversion gain of the nuclear pulse amplitude analyzing unit in the nuclear energy spectrum processing module is set to 512, 1024, 2048 or 4096, and the high voltage is set to the nominal voltage value of the detector. The amplification factor of an amplitude adjusting circuit in the nuclear pulse preprocessing unit is adjusted appropriately to make the measurement range of the nuclear spectrum be 0 to 1.5 MeV, 0 to 3 MeV, or other energy ranges needed for practical application, and the shaping parameters in the nuclear pulse processing module are adjusted in order to output narrow pulses.

A commonly used gamma calibration source is used to illuminate the detector for measuring of the γ energy spectrum, and the calibrating unit is used to complete energy calibration, energy spectrum response calibration, and efficiency calibration. For unknown radioactive sources, the nuclear energy spectrum is measured at the same source distance, and the energy spectrum is analyzed through the nuclear energy spectrum processing module, so that the types of radionuclides can be identified and the radioactivity can be calculated.

As another example, the apparatus for processing the nuclear energy spectrum is a semiconductor detector-based gamma spectrometer. The semiconductor detector may be selected from a CdZnTe room temperature semiconductor detector or a high purity germanium semiconductor detector (HPGe). After the γ-rays enter the semiconductor detector, electron-hole pairs are generated due to the ionization effect. Under the action of an external electric field, electrons and holes are collected by electrodes to form the nuclear pulse signals. The signals are shaped and amplified by the preamplifier and then outputted to the nuclear pulse processing module. The high voltage power supply and the low voltage power supply required by the semiconductor detector is provided by the power supply circuit.

Based on the type of the semiconductor detector that is used, the conversion gain of the nuclear pulse amplitude analyzing unit in the nuclear energy spectrum processing module is set to 2048, 4096, 8192 or 16384, and the high voltage is set to the nominal voltage value of the detector. The amplification factor of an amplitude adjusting circuit in the nuclear pulse preprocessing unit is adjusted appropriately to make the measurement range of the nuclear spectrum be 0 to 1.5 MeV, 0 to 3 MeV, or other energy ranges needed for practical application, and the shaping parameters in the nuclear pulse processing module are adjusted in order to output narrow pulses.

A commonly used γ calibration source is used for measuring of the γ energy spectrum, and the calibrating unit is used to complete energy calibration, energy spectrum response calibration, and efficiency calibration. For unknown radioactive sources, the γ-ray energy spectrum is measured at the same source distance, and the energy spectrum is analyzed through the nuclear energy spectrum processing module, so that the types of radionuclides can be identified and the radioactivity can be calculated.

As yet another example, the apparatus for processing the nuclear energy spectrum is an α spectrometer. The detector may be a passivated implanted planar silicon detector (PIPS), a gold-silicon surface barrier detector (GSSB), or the like. The bias voltage required by the detector is provided by the power supply circuit.

The conversion gain of the nuclear pulse amplitude analyzing unit in the nuclear energy spectrum processing module may be set to 512 or 1024, and the bias voltage is set to the nominal voltage value of the detector. The amplification factor of an amplitude adjusting circuit in the nuclear pulse preprocessing unit is adjusted appropriately to make the measurement range of the nuclear spectrum be 0 to 10 MeV, and the shaping parameters in the nuclear pulse processing module are adjusted in order to output narrow pulses.

A commonly used α calibration source is used for measuring of the α energy spectrum, and the calibrating unit is used to realize energy calibration, energy spectrum response calibration, and efficiency calibration. For unknown radioactive sources, the nuclear energy spectrum is measured at the same source distance, and the energy spectrum is analyzed through the nuclear energy spectrum processing module, so that the types of radionuclides can be identified and the radioactivity can be calculated.

As yet another example, the apparatus for processing the nuclear energy spectrum is an X-ray spectrometer. The detector is an ion-implanted Si-PIN detector or a silicon drift detector (SDD), etc. The bias voltage required by the detector is provided by the power supply circuit.

For the Si-PIN detector and the SDD, the conversion gain of the nuclear pulse amplitude analyzing unit in the nuclear energy spectrum processing module may be set to 1024, and the bias voltage is set to the nominal voltage value of the detector. The amplification factor of the amplitude adjusting circuit in the nuclear pulse preprocessing unit is adjusted appropriately to make the measurement range of the nuclear spectrum be 0 to 10 MeV, and the shaping parameters in the nuclear pulse processing module are adjusted in order to output narrow pulses.

A commonly used X-ray calibration source is used for measuring of the X-ray energy spectrum, and the calibrating unit is used to realize energy calibration, energy spectrum response calibration, and efficiency calibration. For unknown radioactive sources of the same specification, the nuclear energy spectrum is measured at the same source distance, and the energy spectrum is analyzed through the nuclear energy spectrum processing module, so that the energy and the intensity of the incident X-ray can be analyzed.

As yet another example, the apparatus for processing the nuclear energy spectrum is a neutron spectrometer. The detector may be a neutron spectrum detector such as a helium 3 tube (He-3) gas detector or a lithium iodide ($^6$LiI) scintillation detector. The power supply required by the detector is provided by the power supply circuit.

For the above two types of neutron spectrum detectors, the conversion gain of the nuclear pulse amplitude analyzing unit in the nuclear energy spectrum processing module may be set to 1024, and the bias voltage is set to the nominal voltage value of the detector. The amplification factor of the amplitude adjusting circuit in the nuclear pulse preprocessing unit is adjusted appropriately to make the measurement range of the nuclear spectrum be 0 to 15 MeV, and the shaping parameters in the nuclear pulse processing module are adjusted in order to output narrow pulses.

A commonly used neutron calibration source is used for measuring of the neutron energy spectrum, and the calibrating unit is used to realize energy calibration, energy spectrum response calibration, and efficiency calibration. For unknown radioactive sources, the nuclear energy spectrum is measured at the same source distance, and the energy spectrum is analyzed through the nuclear energy spectrum processing module, so that the energy and the intensity of the incident neutrons can be analyzed.

In the embodiments of the application, the type of detector, the conversion gain of the nuclear pulse amplitude analyzing unit, the amplification factor of the amplitude adjustment circuit in the nuclear pulse preprocessing unit, the shaping parameters of the nuclear pulses in the nuclear pulse processing module, and the measurement range of the energy spectrum may be adaptively adjusted based on the type of nuclear radiation to be measured and the nuclear radiation detector used, which are not specifically limited by the embodiments of the present application.

The apparatus for processing the nuclear energy spectrum according to the embodiments of the present application has a wide range of applications, and can realize the measurement and analysis of nuclear energy spectra of various different types of nuclear radiation.

Figure 4:
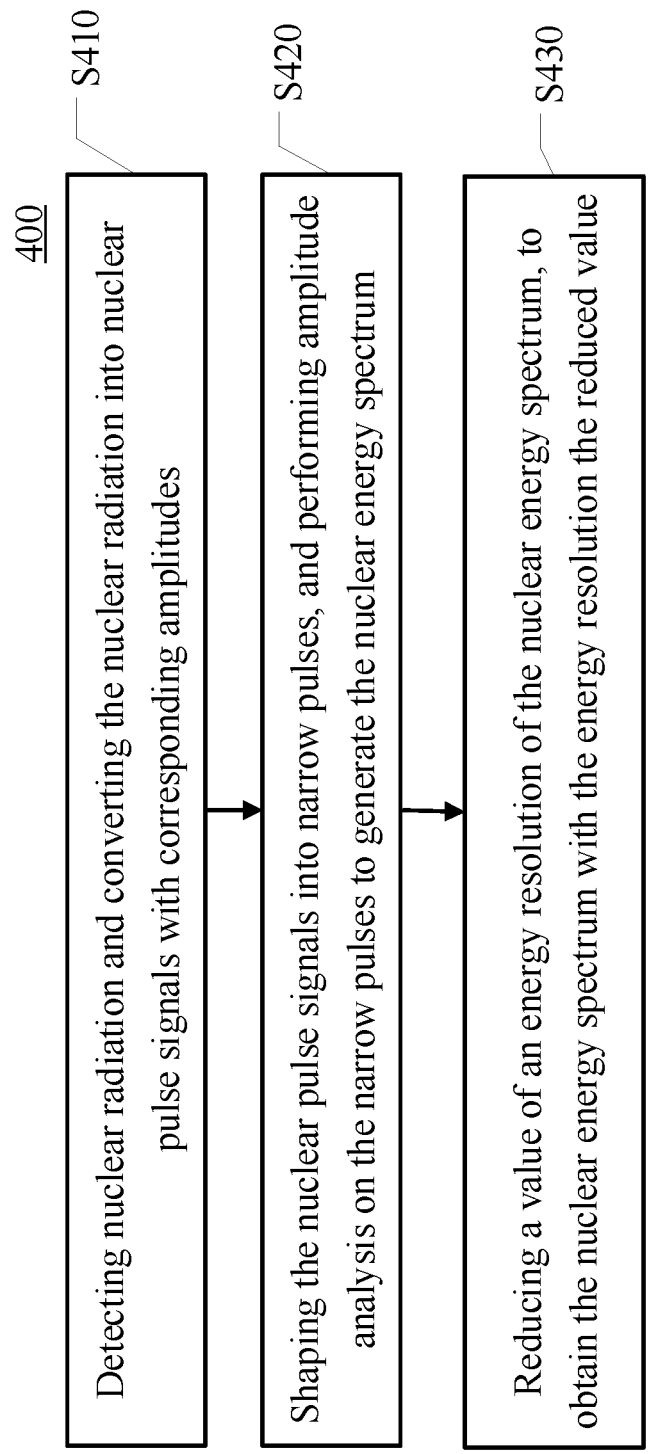
FIG. 4 illustrates a schematic flowchart of a method for processing a nuclear energy spectrum according to an embodiment of the present application.

Based on the foregoing description, a method for processing a nuclear energy spectrum provided by an embodiment of the present application may be summarized as the steps shown in FIG. 4. FIG. 4 illustrates a schematic flowchart of a method for processing a nuclear energy spectrum 400 according to an embodiment of the present application. As shown in FIG. 4, the method for processing a nuclear energy spectrum according this embodiment of the present application includes the following steps:

S410: detecting nuclear radiation and converting the nuclear radiation into nuclear pulse signals with corresponding amplitudes;

S420: shaping the nuclear pulse signals into narrow pulses, and performing amplitude analysis on the narrow pulses to generate the nuclear energy spectrum; and S430, reducing a value of an energy resolution of the nuclear energy spectrum, to obtain the nuclear energy spectrum with the energy resolution of the reduced value.

Figure 5:
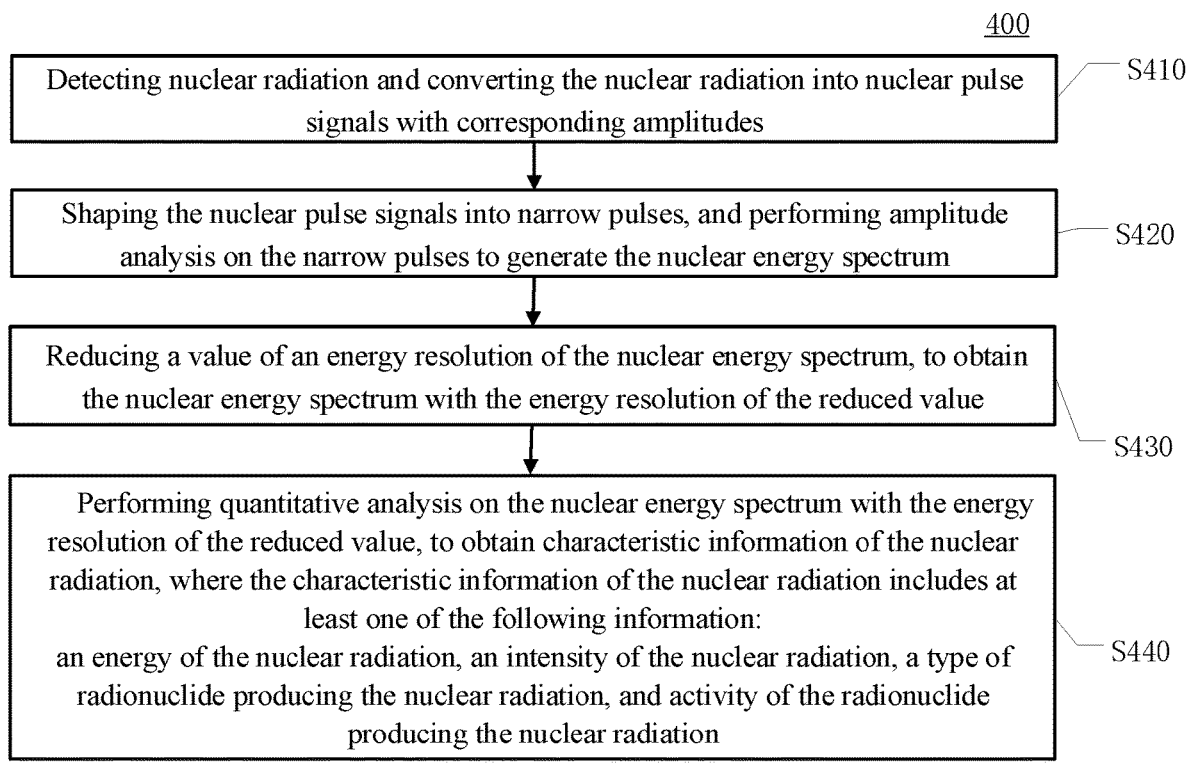
FIG. 5 illustrates a schematic flowchart of a method for processing a nuclear energy spectrum according to another embodiment of the present application.

In some embodiments of the present application, as shown in FIG. 5, the method for processing the nuclear energy spectrum further includes the following step:

S440: performing quantitative analysis on the nuclear energy spectrum with the energy resolution of the reduced value, to obtain characteristic information of the nuclear radiation.

The characteristic information of the nuclear radiation includes at least one of the following information:

an energy of the nuclear radiation, an intensity of the nuclear radiation, a type of radionuclide producing the nuclear radiation, and activity of the radionuclide producing the nuclear radiation.

In an embodiment of the present application, S420 includes the following steps:

shaping the nuclear pulse signals into the narrow pulses, by use of a pre-built nuclear pulse response model;

performing the amplitude analysis on the narrow pulses, to generate the nuclear energy spectrum;

the nuclear pulse response model is a function model that is built by fitting pre-acquired nuclear pulse signals corresponding to standard nuclear radiation particles.

In an embodiment of the present application, S430 includes the following steps:

reducing the value of the energy resolution of the nuclear energy spectrum to obtain the nuclear energy spectrum with the energy resolution of the reduced value, by use of a pre-built nuclear energy spectrum response model;

the nuclear energy spectrum response model is a model that is built based on characteristics of nuclear energy spectra corresponding to various types of monoenergetic nuclear radiation particles with known energies.

In an embodiment of the present application, the nuclear radiation is any one of the following types of nuclear radiation: a gamma ray, a neutron activation prompt gamma ray, an X ray, an alpha ray, or a neutron.

According to the nuclear energy spectrum processing method provided by the embodiments of the present application, the priority is given to speed in the measurement of the energy spectrum. The nuclear pulse signals are converted into the narrow pulses to ensure signal integrity and signal stability. In the analysis of the energy spectrum, the value of the energy resolution of the nuclear energy spectrum is reduced, thereby realizing energy spectrum measurement and analysis with high speed and super resolution.

Other details of the method for processing the nuclear energy spectrum according to the embodiments of the present application are similar to the apparatus for processing the nuclear energy spectrum according to the embodiments of the present application described above in conjunction with FIG. 1 to FIG. 3, which will not be repeated here.

It should be clear that the present application is not limited to the specific configurations and processes described above and shown in the drawings. For the sake of brevity, known methods may not be detailed herein. In the above embodiments, several specific steps are described and shown as examples. However, the processes of the methods provided by the present application are not limited to the specific steps described and shown. Those skilled in the art may make various changes, modifications and additions, or change the order of the steps with the understanding of the gist of the present application.

The above description is only some of the implementations of the present application, and those skilled in the art can clearly understand that for the convenience and simplicity of the description, the specific working processes of the above described system, module and unit may refer to the corresponding processes in the above method embodiments, and will not be repeated herein. It should be understood that the protection scope of the present application is not limited to the specific processes described above, and any skilled people in the art can easily contemplate various equivalent modifications or substitutions within the technical scope as disclosed by the present application, and those modifications or substitutions should be covered by the protection scope of this application.

Although the present application has been described with reference to the preferred embodiments, various modifications may be made thereto and components thereof may be replaced with equivalents without departing from the scope of the present application. In particular, as long as there is no structural conflict, the technical features mentioned in the embodiments can be combined in any manner. This application is not limited to the specific embodiments disclosed herein, instead, it includes all technical solutions that fall within the scope of the claims.

What is claimed is:

1. An apparatus for processing a nuclear energy spectrum, comprising a detector, a nuclear pulse processing module, and a nuclear energy spectrum processing module;

wherein the detector is configured to detect nuclear radiation and convert the nuclear radiation into nuclear pulse signals with corresponding amplitudes;

the nuclear pulse processing module is configured to use a pre-built nuclear pulse response model to shape the nuclear pulse signals into narrow pulses, wherein a pulse width of the nuclear pulse signal is reduced to generate the narrow pulses, and perform amplitude analysis on the narrow pulses to generate the nuclear energy spectrum based on amplitudes of the narrow pulses and a number of the narrow pulses; and the nuclear energy spectrum processing module is configured to reduce a value of an energy resolution of the nuclear energy spectrum, to obtain the nuclear energy spectrum with the energy resolution of the reduced value.

2. The apparatus according to claim 1, wherein the nuclear energy spectrum processing module is further configured to perform quantitative analysis on the nuclear energy spectrum with the energy resolution of the reduced value, to obtain characteristic information of the nuclear radiation;

wherein the characteristic information of the nuclear radiation comprises at least one of the following information:

an energy of the nuclear radiation, an intensity of the nuclear radiation, a type of radionuclide producing the nuclear radiation, and activity of the radionuclide producing the nuclear radiation.

3. The apparatus according to claim 1,
wherein the nuclear pulse response model is a function model that is built by fitting pre-acquired nuclear pulse signals corresponding to standard nuclear radiation particles.

4. The apparatus according to claim 1, wherein the nuclear pulse processing module comprises an analog circuit and/or a digital circuit comprising a digital signal processing device.

5. The apparatus according to claim 1, wherein the nuclear pulse processing module comprises a digital circuit comprising a digital signal processing device, and
wherein the digital signal processing device is a complex programmable logic device (CPLD), a field programmable gate array (FPGA), a digital signal processor (DSP), or a microprocessor (MPU).

6. The apparatus according to claim 1, wherein the nuclear energy spectrum processing module is specifically configured to use a pre-built nuclear energy spectrum response model to reduce the value of the energy resolution of the nuclear energy spectrum to obtain the nuclear energy spectrum with the energy resolution of the reduced value;
the nuclear energy spectrum response model is a model that is built based on characteristics of nuclear energy spectra corresponding to various types of monoenergetic nuclear radiation particles with known energies.

7. The apparatus according to claim 1, wherein the apparatus is any one of the following: a gamma spectrometer, a neutron activation prompt gamma radiation analyzer, an alpha spectrometer, an X Ray X ray spectrometer, and a neutron spectrometer.

8. A method for processing a nuclear energy spectrum, comprising:
detecting nuclear radiation and converting the nuclear radiation into a nuclear pulse signals with corresponding amplitudes;
shaping the nuclear pulse signals into narrow pulses by use of a pre-built nuclear pulse response model, wherein a pulse width of the nuclear pulse signal is reduced to generate the narrow pulses, and performing amplitude analysis on the narrow pulses to generate the nuclear energy spectrum based on amplitudes of the narrow pulses and a number of the narrow pulses; and
reducing a value of an energy resolution of the nuclear energy spectrum, to obtain the nuclear energy spectrum with the energy resolution of the reduced value.

9. The method according to claim 8, further comprising:
performing quantitative analysis on the nuclear energy spectrum with the energy resolution of the reduced value, to obtain characteristic information of the nuclear radiation;
wherein the characteristic information of the nuclear radiation comprises at least one of the following information:
an energy of the nuclear radiation, an intensity of the nuclear radiation, a type of radionuclide by which the nuclear radiation is produced, and activity of the radionuclide by which the nuclear radiation is produced.

10. The method according to claim 8,
wherein the nuclear pulse response model is a function model that is built by fitting pre-acquired nuclear pulse signals corresponding to standard nuclear radiation particles.

11. The method according to claim 8, wherein the reducing a value of an energy resolution of the nuclear energy spectrum, to obtain the nuclear energy spectrum with the energy resolution of the reduced value comprises:
reducing the value of the energy resolution of the nuclear energy spectrum to obtain the nuclear energy spectrum with the energy resolution of the reduced value, by use of a pre-built nuclear energy spectrum response model;
wherein the nuclear energy spectrum response model is a model that is built based on characteristics of nuclear energy spectra corresponding to various types of monoenergetic nuclear radiation particles with known energies.

12. The method according to claim 8, wherein the nuclear radiation is any one of the following types of nuclear radiation: a gamma ray, a neutron activation prompt gamma ray, an X-ray, an alpha ray, or a neutron.

* * * * *